US012654819B2

(12) United States Patent　　(10) Patent No.:　US 12,654,819 B2
　　　Iwata　　　　　　　　　　　　　(45) Date of Patent:　Jun. 16, 2026

(54) PERSONAL WATERCRAFT

(71) Applicant: KAWASAKI MOTORS, LTD., Hyogo (JP)

(72) Inventor: Tetsuya Iwata, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 417 days.

(21) Appl. No.: 18/208,909

(22) Filed: Jun. 13, 2023

(65) Prior Publication Data

US 2024/0417040 A1　　Dec. 19, 2024

(51) Int. Cl.
　　*B63B 34/10*　　　(2020.01)
　　*B63B 49/00*　　　(2006.01)
　　*G01S 15/96*　　　(2006.01)
(52) U.S. Cl.
　　CPC .............. *B63B 34/10* (2020.02); *B63B 49/00* (2013.01); *G01S 15/96* (2013.01)
(58) Field of Classification Search
　　CPC .......... B63B 34/10; B63B 49/00; G01S 15/96
　　See application file for complete search history.

(56) References Cited

U.S. PATENT DOCUMENTS

| | | | | |
|---|---|---|---|---|
| 5,941,188 | A * | 8/1999 | Takashima | B63B 49/00 440/87 |
| 6,892,666 | B1 * | 5/2005 | Plante | B63B 34/10 114/364 |
| 2022/0135191 | A1 * | 5/2022 | Ebisui | B63B 34/10 114/343 |
| 2022/0371700 | A1 * | 11/2022 | Hall | B62K 21/18 |

* cited by examiner

*Primary Examiner* — S. Joseph Morano
*Assistant Examiner* — Jovon E Hayes
(74) *Attorney, Agent, or Firm* — XSENSUS LLP

(57)　　　　ABSTRACT

A personal watercraft includes a watercraft body including an operator boarding section, a first monitor, a side mirror, and a second monitor. The first monitor is arranged forward the operator boarding section and the vicinity of a center axis passing through a left-right direction center of the watercraft body and extending in a front-rear direction of the watercraft body. The side mirror is arranged forward the operator boarding section and on at least one of left and right with respect to the center axis of the watercraft body. The second monitor is arranged between the first monitor and the left or right side mirror.

20 Claims, 10 Drawing Sheets

FIG.5

PERSONAL WATERCRAFT

BACKGROUND

Technical Field

The present disclosure relates to a personal watercraft.

Background Art

The personal watercraft disclosed in US 2022/0,371,700 A is equipped with a monitor that displays state information of the personal watercraft. The monitor is arranged forward the operator seat and on a center axis in the front-rear direction of the watercraft body.

It is desirable that not only the state information but also additional information such as map information and weather information can be displayed to the operator. However, equipping of the monitor shall not deteriorate operability of the personal watercraft.

SUMMARY

It is an object of the present disclosure to provide a personal watercraft capable of presenting various types of information to the operator without deteriorating operability. A personal watercraft according to a first aspect of the present disclosure includes: a watercraft body including an operator boarding section; a first monitor arranged forward the operator boarding section and in a vicinity of a center axis passing through a left-right direction center of the watercraft body and extending in a front-rear direction of the watercraft body; a side mirror arranged forward the operator boarding section and on at least one side of left and right with respect to the center axis of the watercraft body; and a second monitor arranged between the first monitor and the left or right side mirror.

A personal watercraft according to another aspect of the present disclosure includes: a watercraft body including an operator boarding section; a left side mirror and a right side mirror arranged forward the operator boarding section and on a left side and a right side, respectively, with respect to a center axis passing through a left-right direction center of the watercraft body and extending in a front-rear direction of the watercraft body; and a first monitor and a second monitor arranged forward the operator boarding section and between the left side mirror and the right side mirror, in which the first monitor is arranged closer to the center axis relative to the second monitor.

A personal watercraft according to still another aspect of the present disclosure includes: a watercraft body including an operator seat on which an operator boards; a side mirror arranged forward the operator seat and away in one of a left-right direction of the watercraft body from a center axis passing through a left-right direction center of the watercraft body and extending in the front-rear direction; a first monitor arranged forward the operator seat and closer to the center axis of the watercraft body relative to the side mirror; and a second monitor arranged forward the operator seat, closer to the center axis of the watercraft body relative to the side mirror, and closer to outside in the left-right direction relative to the first monitor.

BRIEF DESCRIPTION OF THE DRAWINGS

FIG. 5 is a perspective view of the vicinity of a second monitor viewed from a side.

DETAILED DESCRIPTION

Embodiments of a personal watercraft 1 according to the present disclosure will be described below with reference to the drawings. Some drawings are given direction indication of front, rear, left, and right, and these directions match directions viewed from an operator boarding the watercraft 1. In the embodiments described below, an example will be described in which the personal watercraft 1 is a jet propulsion type personal watercraft that navigates on water in reaction to water flow jetted rearward.

[Overall Structure of Personal Watercraft]

Figure 1:
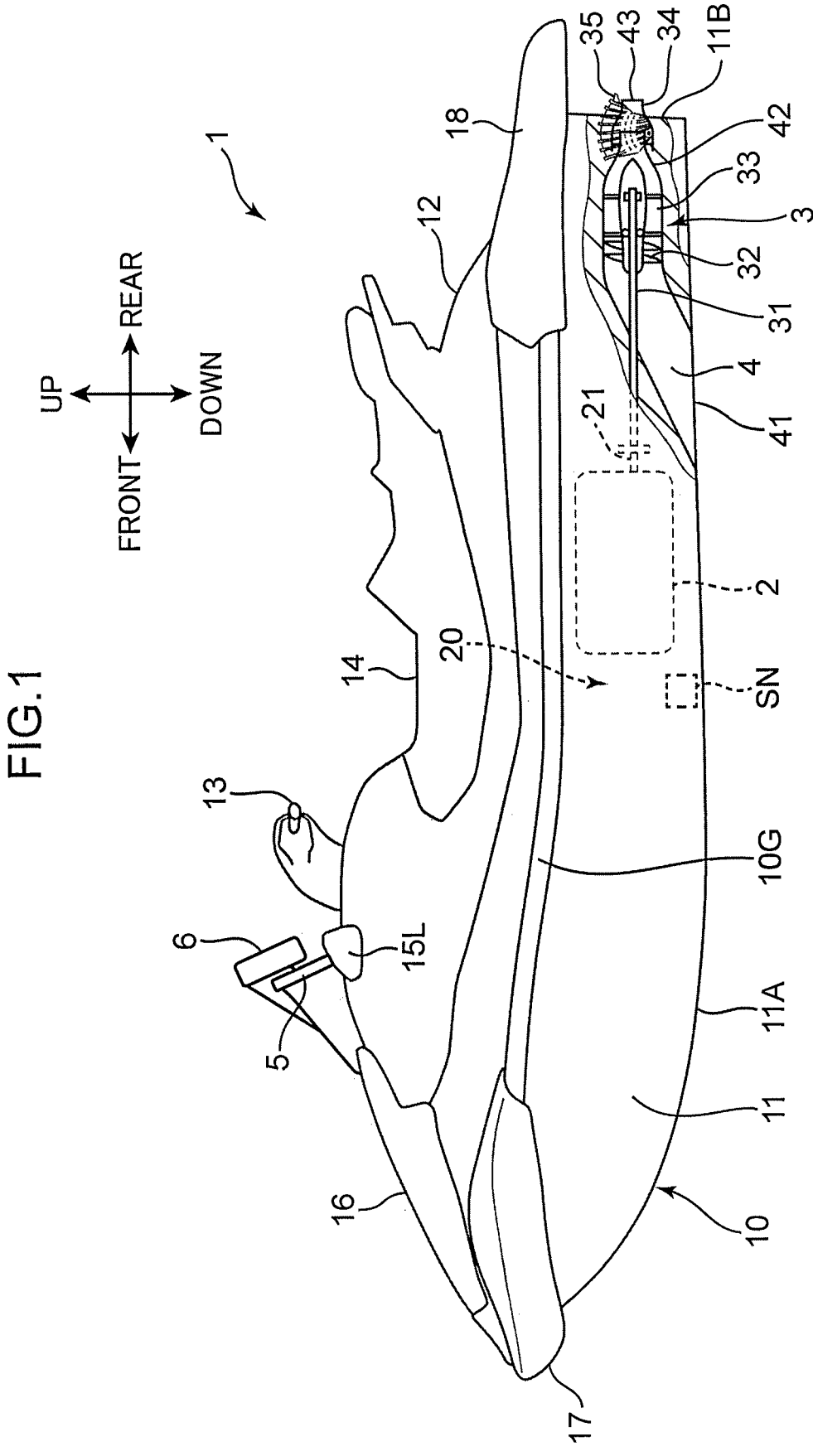
FIG. 1 is a partially broken side view of a personal watercraft according to an embodiment of the present disclosure.
Figure 2:
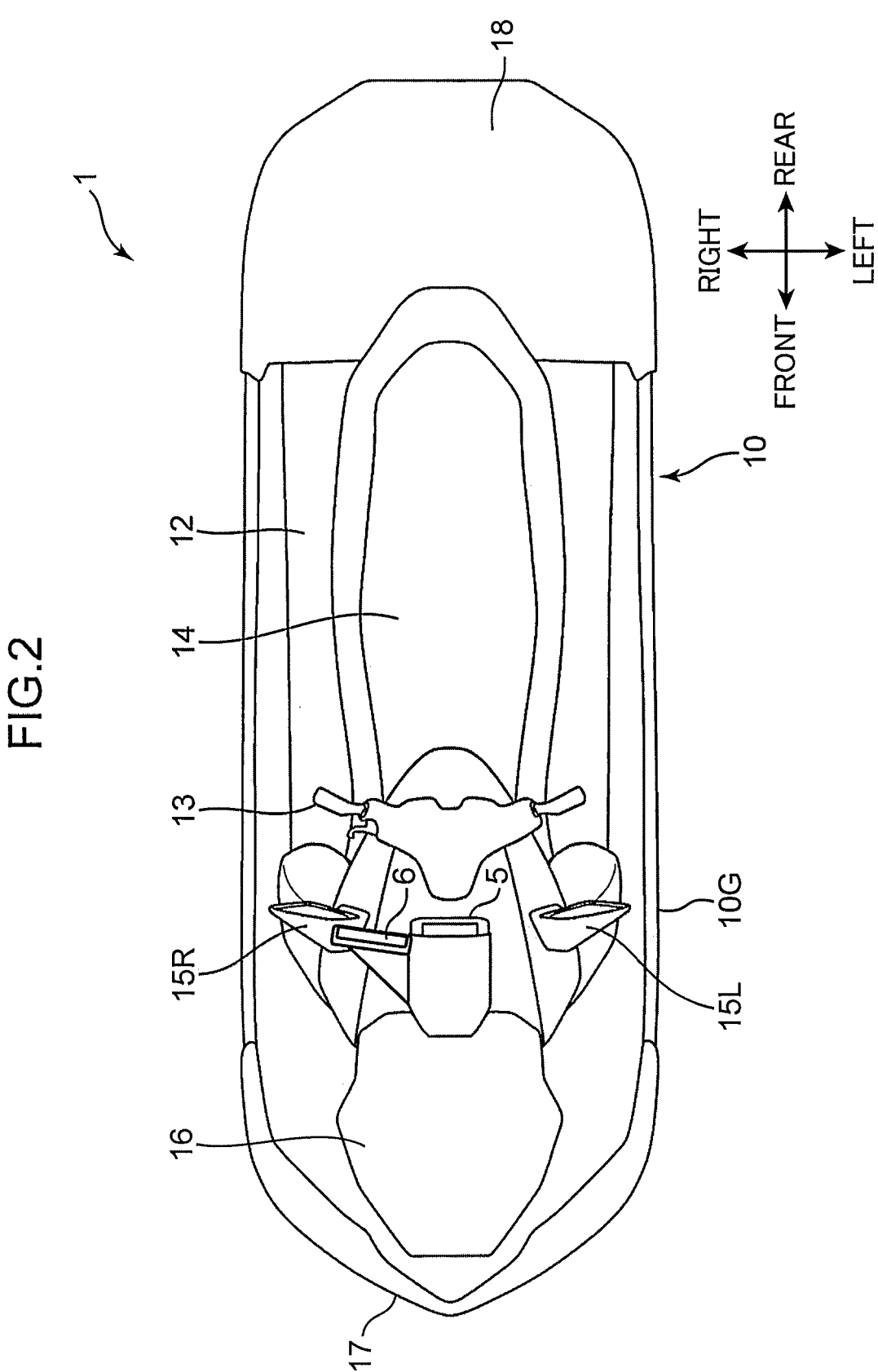
FIG. 2 is a top view of the personal watercraft.

FIG. 1 is a partially broken side view of the personal watercraft 1, and FIG. 2 is a top view thereof. The personal watercraft (PWC) 1 is a straddle-type jet propulsion watercraft that jets a water flow rearward and navigates in reaction to the water flow. The personal watercraft 1 includes a watercraft body 10, an engine 2, a jet pump 3, an impeller passage 4, a first monitor 5, and a second monitor 6.

The watercraft body 10 includes a hull 11 and a deck 12 covering the upper surface of the hull 11, and is propelled with a jet water flow. The hull 11 and the deck 12 are connected to each other over the entire circumference by a gunwale line 10G. The deck 12 includes a handle 13, an operator seat 14 as an operator boarding section, a rearview left side mirror 15L and a rearview right side mirror 15R, the first monitor 5, and the second monitor 6. In the present embodiment, the first monitor 5 displays state information of the watercraft body 10 such as a watercraft speed and a remaining amount of fuel. The second monitor 6 displays additional information other than the state information. For example, as the additional information, an underwater object detected by sonar and map information indicating the position of the watercraft body may be displayed.

The handle 13 includes a throttle lever and is operated by the operator for steering the personal watercraft 1. The operator seat 14 is arranged at a substantially center position in front and rear as well as left and right of the deck 12, and is a seat where the operator and a passenger straddle. The present embodiment exemplifies the operator seat 14 for three persons including the operator. In a case of a stand-up type personal watercraft, the operator boarding section is a foot space serving as a foothold for the operator.

The side mirrors 15R and 15L are arranged forward the operator seat 14 and the handle 13. The left side mirror 15L and the right side mirror 15R are arranged on the left side and the right side, respectively, with respect to a center axis C (see FIG. 2) passing through the left-right direction center of the watercraft body 10 and extending in the front-rear direction of the watercraft body 10. An interval between the left side mirror 15L and the right side mirror 15R is substantially equal to a left-right width of handle 13 excluding a grip portion. Any one of the left and right side mirrors 15L and 15R may be omitted.

The deck 12 further includes a front hatch 16, a front bumper 17 and a boarding platform 18. The front hatch 16 covers an upper surface opening of a luggage room provided in front of the first monitor 5. The front bumper 17 covers the foremost part of the watercraft body 10. The boarding platform 18 is arranged rearward the operator seat 14 so as to cover the hull 11 and is used mainly when the operator or the passenger straddles the operator seat 14 from under water.

The engine 2 is accommodated in and supported by an engine room 20 provided inside the hull 11. The engine 2 is, for example, a water-cooled four-stroke multicylinder engine using gasoline as fuel, and generates a driving force for driving the jet pump 3. The engine 2 includes a crankshaft 21 extending in the front-rear direction.

A sonar SN is arranged forward the engine 2 and on a watercraft bottom 11A of the watercraft body 10. The sonar SN is a device that detects an object by transmitting and receiving sound waves. In the present embodiment, the sonar SN is arranged for detecting an object in the underwater or the bottom of water below the watercraft body 10. Specific examples of the sonar SN include a searchlight sonar capable of detecting underwater information such as a fish school, a shoal, and an obstacle existing underwater at 360 degrees around the watercraft body 10.

In order to give the personal watercraft 1 a propulsive force, the jet pump 3 pressurizes and accelerates the water taken into the impeller passage 4 and injects the water rearward. The jet pump 3 is arranged rearward the engine 2. The jet pump 3 includes a pump shaft 31, an impeller 32, a pump case 33, a jet nozzle 34, and a reverse gate 35. The rear end of the pump shaft 31 is attached with the impeller 32, and the front end is coupled to the rear end of the crankshaft 21.

The impeller 32 generates a jet water flow by rotating about an axis. The driving force of the engine 2 is transmitted to the impeller 32 via the crankshaft 21 and the pump shaft 31. The pump case 33 is arranged rearward the impeller 32 and rotatably supports the rear end side of the pump shaft 31.

The jet nozzle 34 is arranged rearward the pump case 33 and has an outlet port 43 for jetting the jet water flow generated by the impeller 32. The jet nozzle 34 is pivotable about an axis extending in the up-down direction, and the jet direction of the jet water flow from the outlet port 43, that is, the propulsion direction of the personal watercraft 1 is changed left and right by the steering of the handle 13.

The impeller passage 4 is provided in a rear region of the hull 11, and the impeller 32 is arranged in the impeller passage 4. The impeller passage 4 includes a water intake 41 formed in the watercraft bottom 11A of the hull 11 as a water suction port. The discharge port of the impeller passage 4 is the outlet port 43 described above. The impeller passage 4 is a water passage for pressurizing, by the impeller 32, water sucked from the water intake 41 and injecting the water from the outlet port 43.

Figure 3:
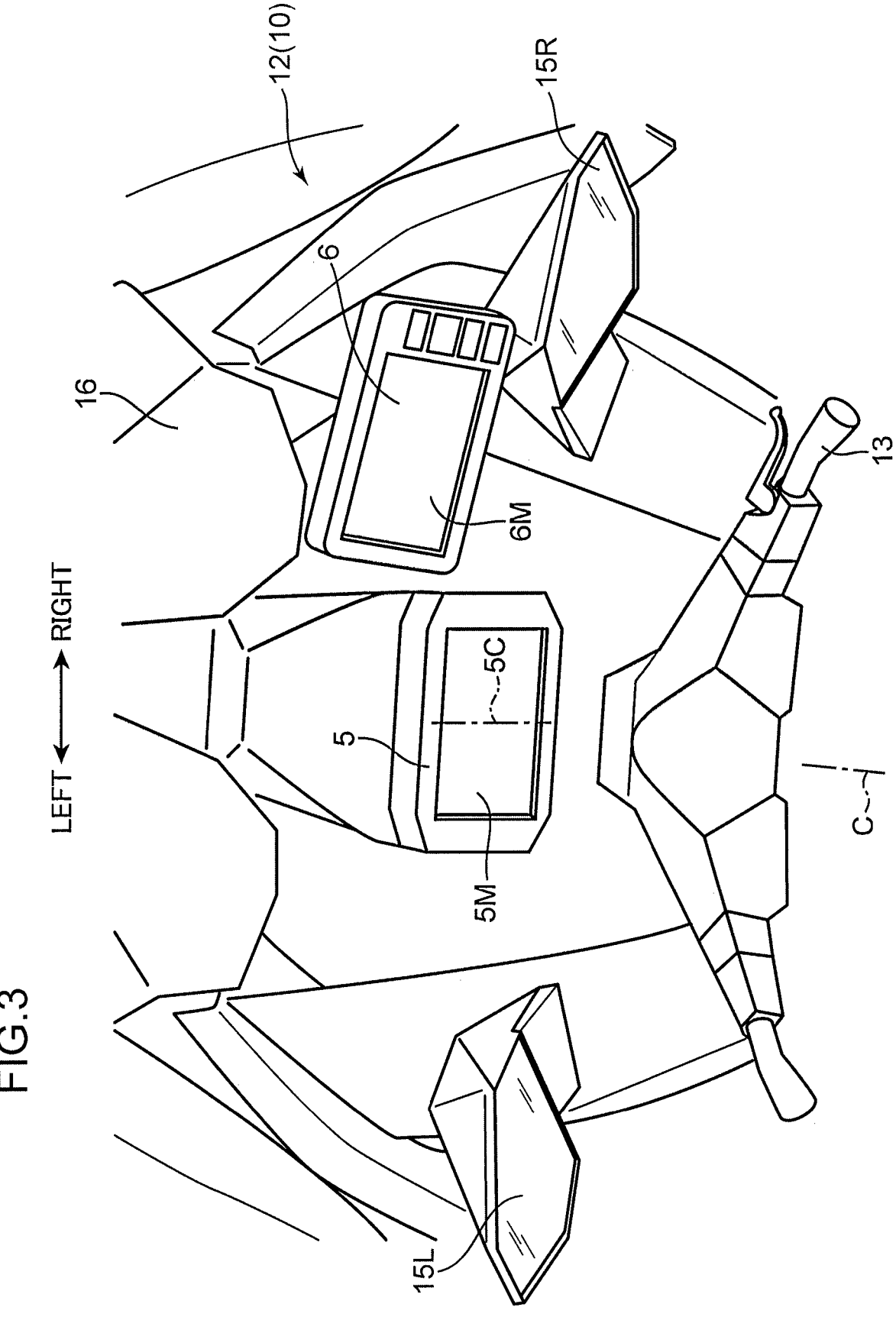
FIG. 3 is a perspective view of a front side of an operator seat of the personal watercraft.

The first monitor 5 and the second monitor 6 display information such as characters, symbols, data, graphs, still images, and moving images depending on respective settings. FIG. 3 is a perspective view of the front side of the operator seat 14 of the personal watercraft 1, and is a view illustrating an arrangement of the first monitor 5 and the second monitor 6. FIG. 3 also illustrates the center axis C illustrated in FIG. 2. The first monitor 5 and the second monitor 6 each are a monitor having a horizontally long rectangular screen. For example, a full color TFT liquid crystal display can be used as the first monitor 5 and the second monitor 6.

The first monitor 5 is arranged on the center axis C of the watercraft body 10. That is, the first monitor 5 is attached on the deck 12 such that a monitor center 5C in the left-right direction of the first monitor 5 and the center axis C are matched. The monitor center 5C and the center axis C need not strictly match each other, and the first monitor 5 only needs be arranged such that the monitor center 5C exists in the vicinity of the center axis C. For example, arranging a part of a screen 5M of the first monitor 5 so as to lie on the axis of the center axis C is an example of arranging the first monitor 5 in the vicinity of the center axis C.

The second monitor 6 is arranged between the first monitor 5 and the right side mirror 15R. More specifically, the second monitor 6 is arranged at a position overall higher than the right side mirror 15R and obliquely upper left of the right side mirror 15R, and is arranged at a position partially higher than the first monitor 5 and obliquely upper right of the first monitor 5. In the arrangement in the front-rear direction, as illustrated in FIG. 1, the second monitor 6 is positioned slightly forward the mirror surface of the right side mirror 15R and slightly rearward the first monitor 5. The second monitor 6 may be arranged between the first monitor 5 and the left side mirror 15L.

According to the present embodiment, since two monitors of the first monitor 5 and the second monitor 6 are included, it is possible to provide diverse information to the operator or the passenger through the monitor as compared with a case of arranging one monitor at the center. Although the two monitors are arranged forward the operator seat 14, the first monitor 5 and the second monitor 6 are arranged so as not to overlap the side mirrors 15L and 15R in the front-rear direction, in particular, the right side mirror 15R and the second monitor 6 are arranged so as not to overlap each other in the front-rear direction. Therefore, it is possible to present the operator the display information by the second monitor 6 in addition to the display information of the first monitor 5 while ensuring rear visibility by the side mirrors 15L and 15R of the operator on the operator seat 14.

In a case where the second monitor is mounted on the personal watercraft, when it is difficult to set the monitor arrangement position, it is conceivable to arrange the monitor in a superimposed manner at any arrangement position of the left and right side mirrors 15L and 15R. Such monitor arrangement covers the mirror surface of the side mirror and disables rearward visual recognition, but such problem does not occur in the present embodiment.

The arrangement of the first monitor 5 and the second monitor 6 can also be described as follows. The first monitor 5 and the second monitor 6 are arranged between the left side mirror 15L and the right side mirror 15R. That is, the first monitor 5 and the second monitor 6 are arranged between the left and right side mirrors 15L and 15R. In addition, the first monitor 5 is arranged closer to the center axis C relative to the second monitor 6.

It can also be described as follows. The first monitor 5 is arranged closer to the center axis C relative to the left side mirror 15L and the right side mirror 15R. That is, the first monitor 5 is arranged between the left and right side mirrors 15L and 15R. The second monitor 6 is also arranged closer to the center axis C relative to the left side mirror 15L and the right side mirror 15R. However, the second monitor 6 is arranged closer to the outside in the left-right direction (to the right in the present embodiment) relative to the first monitor 5.

According to the arrangement based on the above description, the first monitor 5 and the second monitor 6 are arranged between the left and right side mirrors 15L and 15R. Therefore, the left and right side mirrors 15L and 15R are arranged so as not to overlap the side mirrors 15L and 15R in the front-rear direction as viewed from the operator on the operator seat 14. Therefore, it is possible to present the operator the display information by the first monitor 5 and the second monitor 6 while ensuring rear visibility by the left and right side mirrors 15L and 15R. The first monitor 5 is arranged at a position closer to the center axis C relative to the second monitor 6, that is, a position where the operator who is operating the personal watercraft 1 can easily cast a visual line. In consideration of such visibility, information to be displayed on the first monitor 5 and the second monitor 6 can be appropriately set.

As clear from FIG. 3, the second monitor 6 has a display region larger than that of the first monitor 5. That is, the size of a screen 6M serving as the information display region on the second monitor 6 is set larger than the size of the screen 5M serving as the information display region on the first monitor 5. For example, the first monitor 5 is a 7-inch monitor, and the second monitor 6 is an 8-inch monitor. Setting the screen size in this manner is advantageous in a case of displaying detailed additional information such as map information on the second monitor 6 having a wide size.

[Electrical Configuration of Personal Watercraft]

Figure 4:
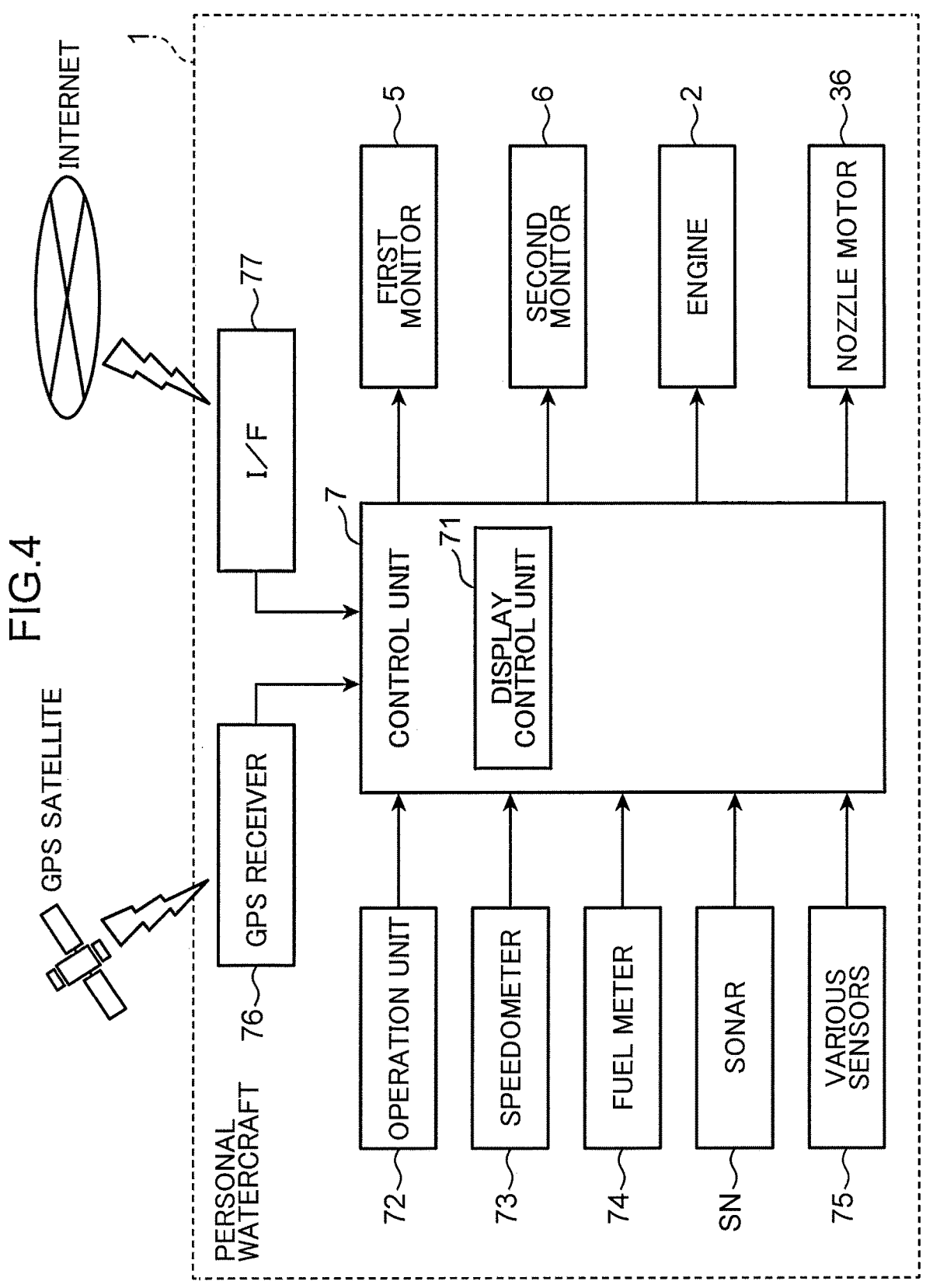
FIG. 4 is a block diagram illustrating an electrical configuration of the personal watercraft.

FIG. 4 is a block diagram illustrating the electrical configuration of the personal watercraft 1. The personal watercraft 1 includes, in addition to the engine 2, the first monitor 5, the second monitor 6, and the sonar SN described above, an operation unit 72, a speedometer 73, a fuel meter 74, various sensors 75 equipped on the personal watercraft 1, a GPS receiver 76, an interface 77, and a nozzle motor 36, and a control unit 7 that integrally controls operations of them.

The operation unit 72 is a unit that receives operation information on traveling of the personal watercraft 1 from the operator, and includes a start switch, a stop switch, and a throttle. The start switch is a switch for starting the engine 2. The stop switch is a switch for forcibly stopping the engine 2, and is operated by the operator pressing the stop switch or pulling out the tether cord. The throttle is equipped on the handle 13 and controls output of the engine 2.

The speedometer 73 measures the planing speed of the personal watercraft 1. The fuel meter 74 detects the remaining amount of fuel stored in a fuel tank of the engine 2. The various sensors 75 include environment sensors such as a thermometer, a hygrometer, and a barometer, a clock for time display, and a sensor attached to the engine 2, an engine water temperature sensor, an engine speed sensor, and an intake-exhaust related sensor. The GPS receiver 76 receives GPS data from a GPS satellite. The interface 77 acquires Web data via the Internet. The nozzle motor 36 is a power source that changes the attitude of the reverse gate 35 in order to switch the propulsion mode of the personal watercraft 1 to forward or rearward.

The control unit 7 includes a microprocessor or the like, and, based on a program stored in a memory not illustrated, controls operation of each unit of the personal watercraft 1. The control unit 7 operates to functionally include a display control unit 71 by reading the program. The control unit 7 also includes other functional units such as engine control that are not illustrated in FIG. 4.

The display control unit 71 controls display operations of the first monitor 5 and the second monitor 6. The display control unit 71 generates display information based on local information of the personal watercraft 1 acquired from the speedometer 73, the fuel meter 74, the various sensors 75, and the sonar SN, and external information acquired from the GPS receiver 76 and the interface 77, and displays the display information on the first monitor 5 and the second monitor 6. Hereinafter, a specific example of an information display aspect onto the first monitor 5 and the second monitor 6 by the display control unit 71 will be described.

[Specific Example of Display Aspect of Monitor]

As already mentioned, the first monitor 5 is arranged at a position closer to the center axis C of the watercraft body 10 relative to the second monitor 6. Generally, an operator who is operating the personal watercraft 1 grips the handle 13 extending left and right from the center axis C, and the head of the operator is on the axis of the center axis C and the operator's visual line faces forward. Since the first monitor 5 is arranged in the vicinity of the center axis C, the operator can view the first monitor 5 only by slightly lowering the visual line. That is, the first monitor 5 is arranged at a position where the operator can easily cast a visual line, and is good in visibility.

On the other hand, since the second monitor 6 is arranged between the first monitor 5 and the right side mirror 15R, the visual line is undeniably more difficult to cast than the first monitor 5. However, it is true that the visibility of the both monitors 5 and 6 is equivalent when the watercraft is stopped. Moreover, since the second monitor 6 has a larger screen size than the first monitor 5 has, the second monitor 6 is suitable for displaying detailed image information. In consideration of the individual advantages as described above, the display aspects of the first monitor 5 and the second monitor 6 can be set as follows, for example.

As described above, in the present embodiment, the display control unit 71 controls the display operation such that the first monitor 5 displays the state information of the watercraft body 10 and the second monitor 6 displays additional information other than the state information. The state information is information related to the watercraft body 10 necessary for the operation of the personal watercraft 1, and is, for example, at least one of the traveling speed of the watercraft body 10, the traveling time, the remaining amount of fuel, and the presence or absence of abnormality of the engine 2, which is the drive source of the watercraft body 10. It is possible to acquire the information on the traveling speed from the speedometer 73, the traveling time from the clock of the various sensors 75, the information on the remaining amount of fuel from the fuel meter 74, and the information on the presence or absence of abnormality of the engine 2 from a sensor attached around the engine among the various sensors 75. The display control unit 71 processes the acquired raw information to create required display information, and generates a predetermined display screen for display on the first monitor 5.

The additional information is information that is less related to the operation of the personal watercraft 1 but that the operator desires to display, and is any one or more of, for example, map information, position information of the watercraft body 10, obstacle information and fish school information underwater, water depth information, weather information, tidal information, and water temperature information. It is possible to acquire the map information and the position information from GPS data received by the GPS receiver 76 from a GPS satellite, water depth or obstacle information from the sonar SN, meteorological information such as weather information and tidal information from web data acquired by the interface 77 via the Internet, and water temperature information from a temperature sensor or the like of the various sensors 75. The display control unit 71 processes the acquired data to create required display information, and generates a predetermined display screen for display on the second monitor 6.

In addition to the above, information particularly preferable as the additional information is fish-finding information. The sonar SN is a sensor that detects an underwater state below the watercraft body 10, and can detect a fish school existing underwater. In recent years, an increasing number of users move to fishing points on rivers, ponds, lakes, or the sea with the personal watercraft 1 and enjoy fishing on the personal watercraft 1. Therefore, by displaying the fish-finding information sensed by the sonar SN onto the second monitor 6, it is possible to provide useful information to users who enjoy fishing.

By employing the display aspect described above, state information on the watercraft body 10 necessary for the operation of the personal watercraft 1 is displayed on the first monitor 5 arranged in the vicinity of the center axis C of the watercraft body 10. Therefore, it is possible to display the state information in an easy-to-see manner to the operator who is operating the personal watercraft 1. Additional information desired by the operator can be appropriately displayed through the second monitor 6.

The second monitor 6 may be treated as a monitor that displays image information other than characters, and various types of image information may be provided to the operator. For example, using the acquired GPS data, the display control unit 71 causes the second monitor 6 to display the current position of the personal watercraft 1 onto a map indicating the surrounding terrain in a superimposed manner. In addition to this, the second monitor 6 may be caused to display a ultrasonic video of signs of fish, a graph indicating the water depth, a still image or a moving image showing weather or tidal information such as rain radar, image information of a website or a video of a moving image site acquired via the Internet, and the like. In a case where the personal watercraft 1 is mounted with a camera for capturing rear or side blind spots, a night vision camera for night use, or the like, images captured by these cameras may be displayed on the second monitor 6.

Pieces of information to be displayed on the first monitor 5 and the second monitor 6 may be divided as follows. The display control unit 71 controls the display operation such that the first monitor 5 displays the traveling information that changes in response to the traveling of the watercraft body 10, and the second monitor 6 displays the traveling stopping information that changes even in the traveling stop state of the watercraft body 10. The traveling information is information such as the above-mentioned traveling speed, the traveling time, the remaining amount of fuel, and the presence or absence of abnormality of the engine 2. These pieces of information change when the personal watercraft 1 travels, but become constant when the personal watercraft 1 is stopped. Examples of the traveling stopping information include underwater information below the watercraft body 10 such as fish-finding information and weather information that changes from moment to moment. Also according to such display aspect, it is possible to display the traveling information in an easy-to-see manner onto the first monitor 5 arranged in the vicinity of the center axis C for the operator who is operating the personal watercraft 1. The traveling stopping information such as underwater information can be appropriately displayed through the second monitor 6.

Note that the display aspects onto the first monitor 5 and the second monitor 6 described above may be reversed. That is, the state information or the traveling information may be displayed on the second monitor 6, and the additional information or the traveling stopping information may be displayed on the first monitor 5. Alternatively, the operator may be selectable either the first monitor 5 or the second monitor 6 as a main monitor, and the state information or the traveling information may be displayed on the monitor selected as the main monitor.

[Second Monitor and Peripheral Structure Thereof]

Figure 5:
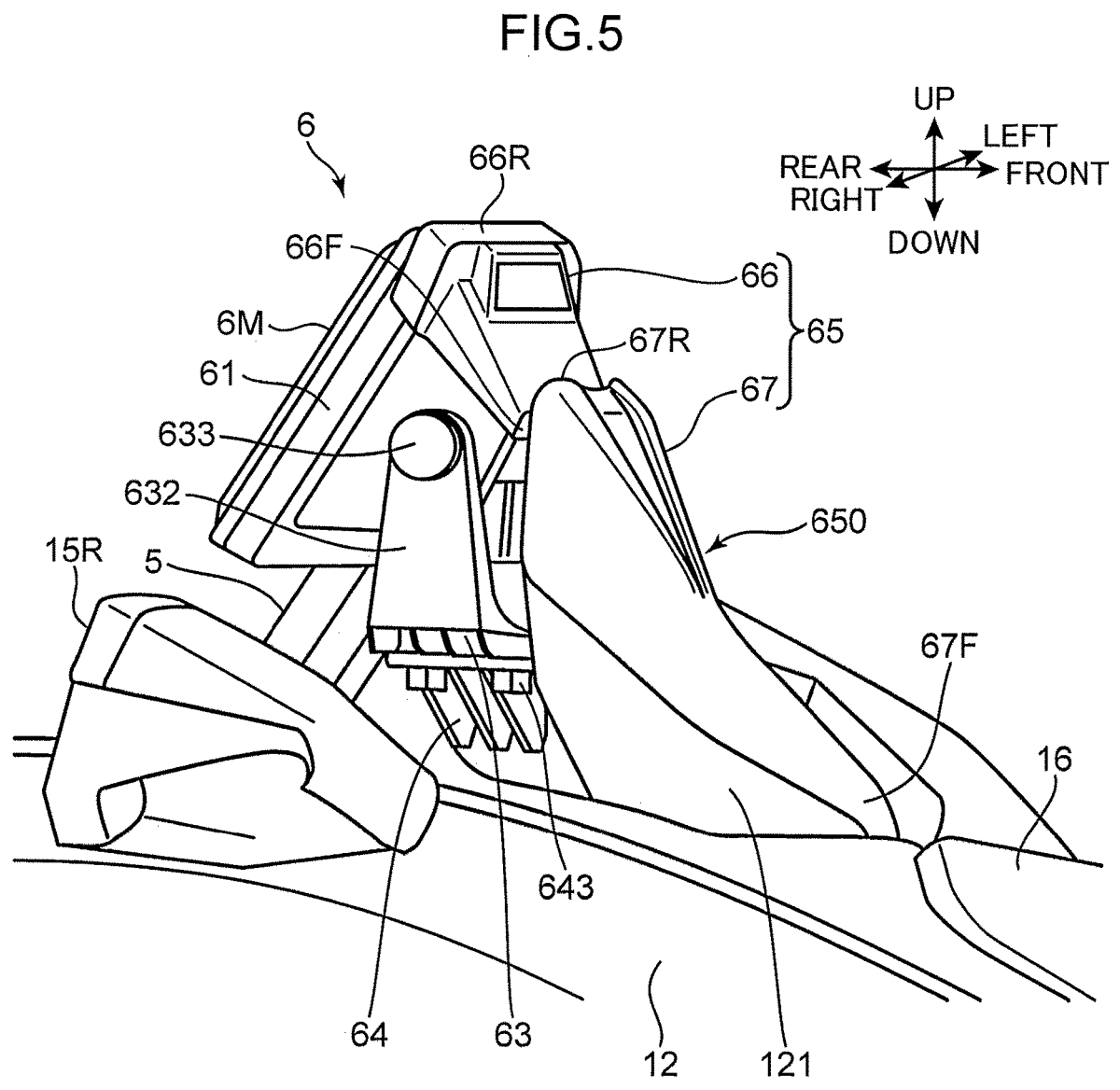
Figure 6:
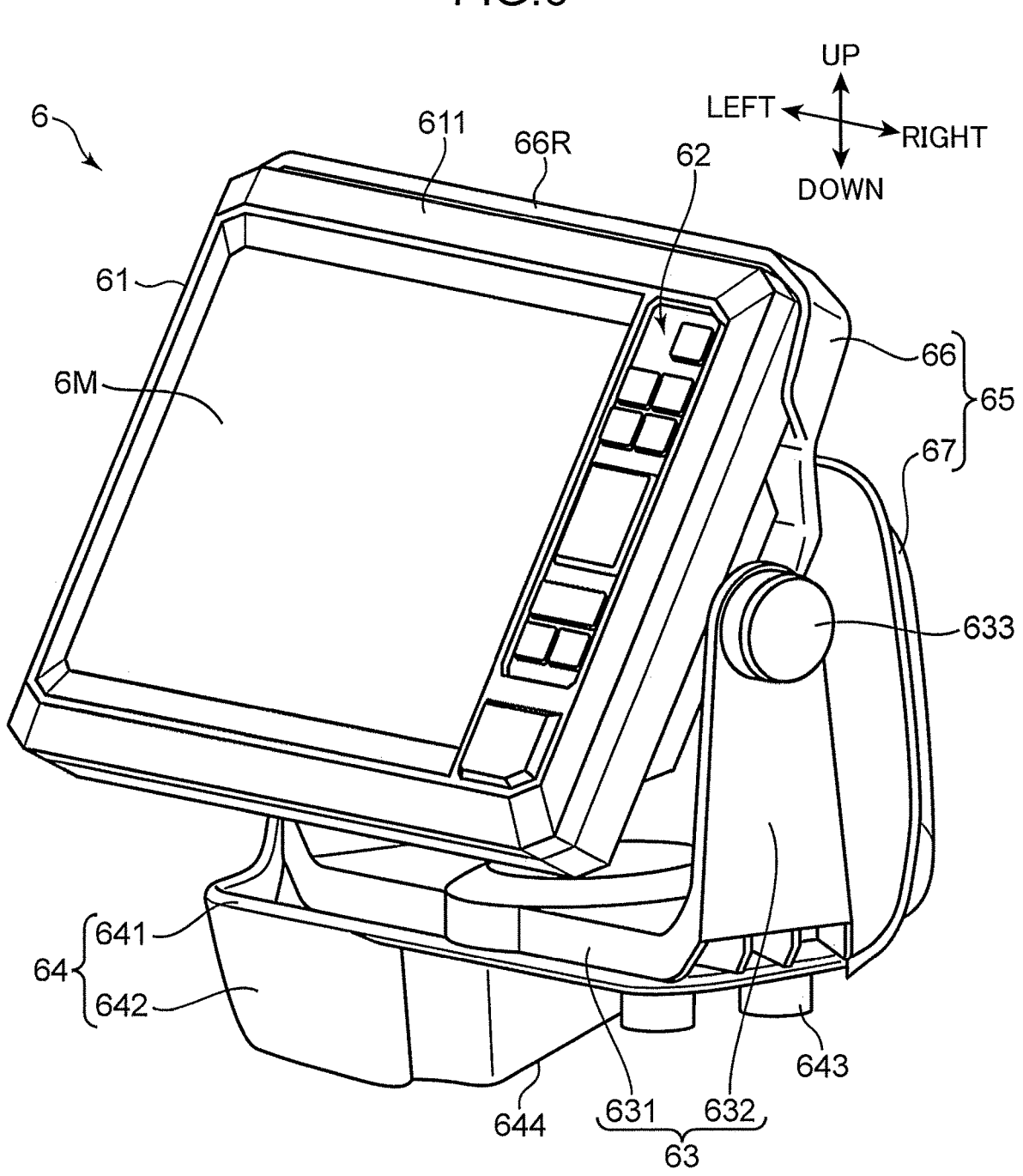
FIG. 6 is a perspective view of a second monitor alone.
Figure 7:
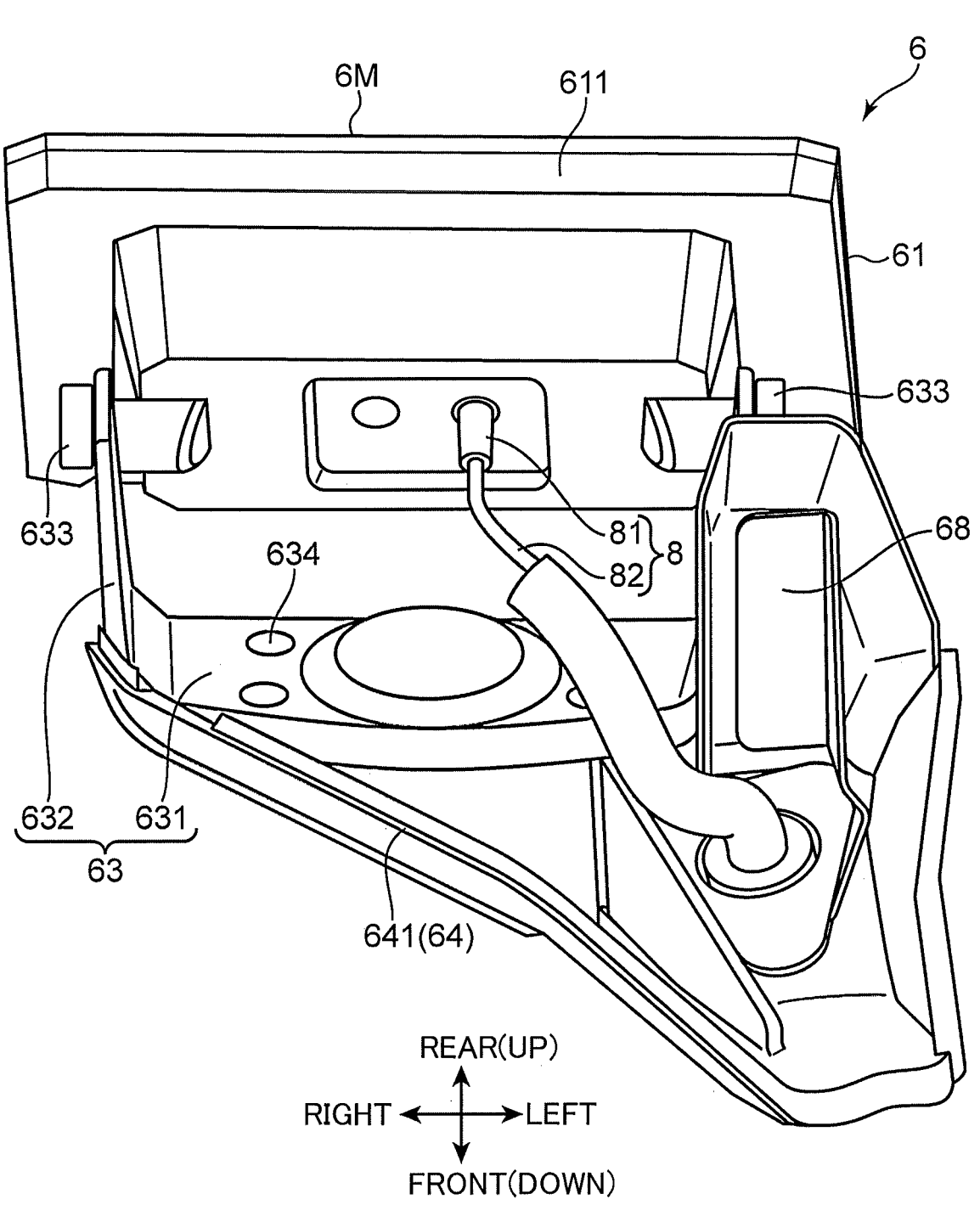
FIG. 7 is a perspective view on a back surface side of the second monitor.
Figure 8:
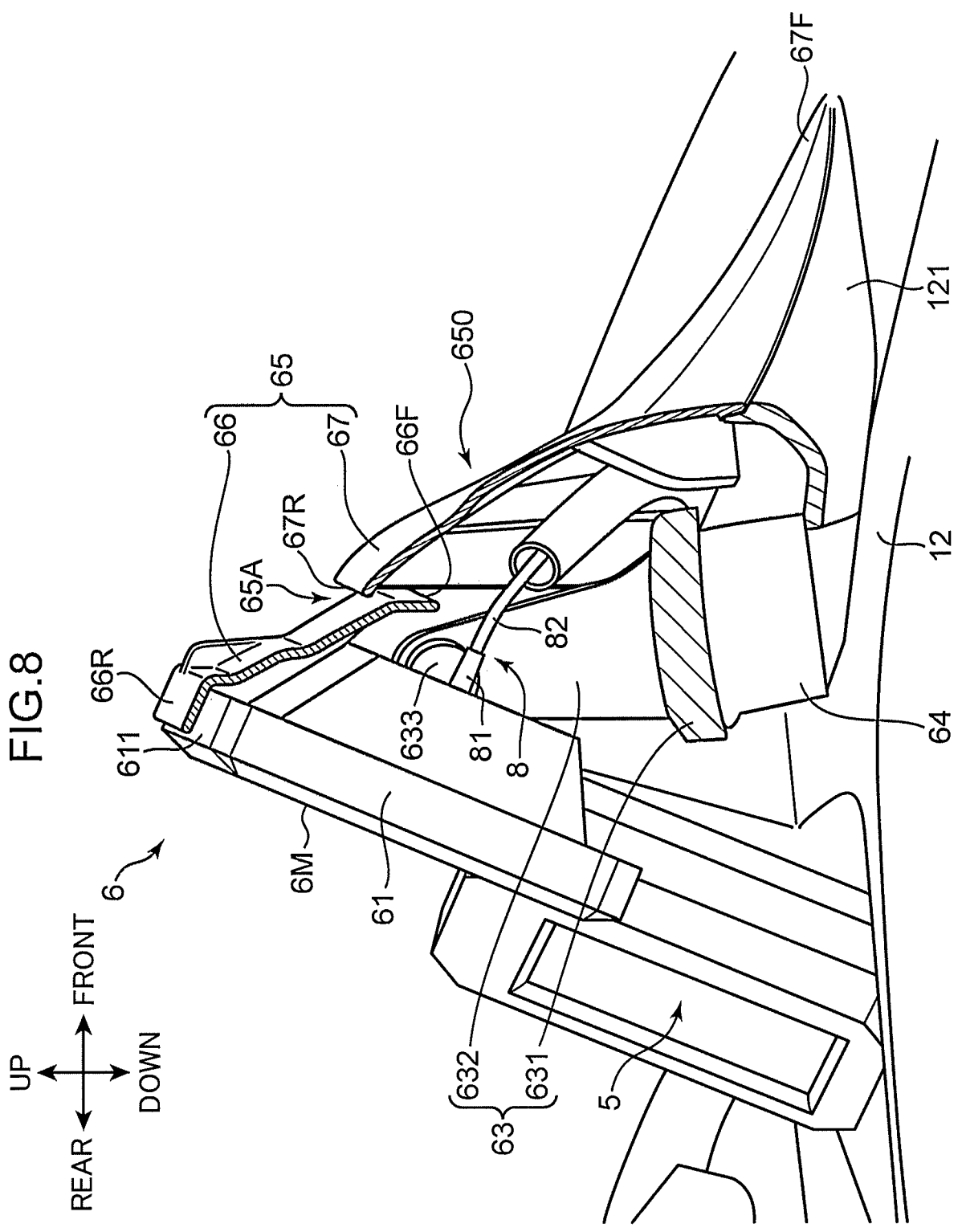
FIG. 8 is a cross-sectional view in the front-rear direction of the vicinity of the second monitor.

Next, specific examples of the structure of the second monitor 6 and peripheral structures such as a support structure on the deck 12 of the second monitor 6 and a protection structure against rainwater, wave splash, and the like will be described with reference to FIGS. 5 to 8. FIG. 5 is a perspective view of the vicinity of the second monitor 6 as viewed from the side, FIG. 6 is a perspective view of the second monitor 6 alone, FIG. 7 is a perspective view of the back surface side of the second monitor 6, and FIG. 8 is a cross-sectional view in the front-rear direction of the vicinity of the second monitor 6.

The second monitor 6 includes the screen 6M serving as an image display region, a monitor housing 61 covering a side periphery and a back surface of the screen 6M, and an operation panel 62 on a side of the screen 6M. The monitor housing 61 accommodates a display element such as a TFI liquid crystal display having the screen 6M, a circuit board driven by the display element, and the like. The operation panel 62 includes a selection button of a display mode of the screen 6M, various operation buttons related to image display, various setting switches, and a cross key.

The second monitor 6 is supported on the upper surface of the deck 12 by a monitor holder 63 and a support 64 as support members, and is covered by a cover 65. The monitor holder 63 and the support 64 hold the second monitor 6 so as to be swingable in the up-down direction. The cover 65 has an inclined surface 650 extending from the upper surface of the deck 12 toward an upper edge 611 of the second monitor 6.

The monitor holder 63 includes a base part 631, a pair of arm parts 632, a swing support part 633, and a fixing bolt 634. The base part 631 is a flat plate extending in the left-right direction. The pair of arm parts 632 extend vertically upward from the left end and the right end in a longitudinal direction of the base part 631. The swing support part 633 is arranged at the upper end of each of the arm parts 632 and supports the monitor housing 61 so as to be tiltable about an axis extending in the left-right direction. The fixing bolt 634 is a bolt for fixing the base part 631 to the support 64 in the vicinity of the left and right end parts of the base part 631.

The support 64 includes a support plate 641, a support pedestal 642, a fixing nut 643, and a cutout part 644 (cutout structure part). The support plate 641 is a flat plate on which the monitor holder 63 is placed, and has a substantially triangular shape in top view. The support pedestal 642 is a member that underpins the support plate 641. The lower end of the support pedestal 642 is fixed to a bracket formed on the upper surface of the deck 12. The fixing nut 643 is screwed to the fixing bolt 634 described above to fasten the base part 631 and the support plate 641. The cutout part 644 is a structure part in which the vicinity of the right end of the support pedestal 642 is obliquely cut out. As illustrated in FIG. 6, the right half of the support pedestal 642 is cut out obliquely upper right direction from the lower end toward the upper end.

As illustrated in FIG. 7, a wiring portion 8 for the second monitor 6 extends from the back surface side of the monitor housing 61. The wiring portion 8 includes a male connector 81 connected to a female connector included in the monitor housing 61 and a cable 82 extending from the male connector 81. The cable 82 penetrates the deck 12 in a state of being covered with a protective tube, and is routed to the inside of the watercraft body 10.

The cover 65 has a shape covering a mount part of the second monitor 6 on the deck 12. The inclined surface 650 of the cover 65 has a shape that is inclined downward toward the front so as not to increase air resistance during planing of the personal watercraft 1. Attaching of the cover 65 can protect the second monitor 6 from rainwater, wave splash, sailing waves of the personal watercraft 1, and the like. More specifically, the cover 65 covers the upper edge 611 of the monitor housing 61 and the wiring portion 8 on the support plate 641. This can achieve water resistance protection not only for the second monitor 6 but also for the support 64 as a support member and the wiring portion 8.

The cover 65 is divided into a first cover 66 on a rear side and a second cover 67 on a front side. That is, as illustrated in FIG. 8, an edge cut portion 65A of the cover 65 exists between the first cover 66 and the second cover 67. The first cover 66 extends forward from the upper edge 611 of the second monitor 6. The second cover 67 extends from the position of a front end 66F of the first cover 66 to the upper surface of the deck 12.

A rear end 66R of the first cover 66 covers the upper side and the left and right sides of the upper edge 611 in an aspect of being fitted to the upper edge 611 of the monitor housing 61. Although FIGS. 5 to 8 illustrate an example in which an end edge of the rear end 66R exists forward relative to the screen 6M, the end edge of the rear end 66R may be extended rearward relative to the screen 6M to cover the second monitor 6 like an eaves. An intermediate part in the front-rear direction of the first cover 66 constitutes a part of the inclined surface 650 and is inclined forward and downward. The front end 66F of the first cover 66 extends substantially vertically downward. The position of the front end 66F is forward relative to the connection position of the male connector 81 of the wiring portion 8 to the monitor housing 61. The first cover 66 is substantially integrated with the monitor housing 61. Therefore, when the monitor housing 61 tilts about the axis of swing support part 633, the first cover 66 also tilts accordingly.

A front end 67F of the second cover 67 gently rises from the upper surface of the deck 12. A rear end 67R of the second cover 67 is positioned slightly rearward relative to the front end 66F of the first cover 66. That is, the front end 66F and the rear end 67R partially overlap each other in the up-down direction. An intermediate part between the front end 67F and the rear end 67R of the second cover 67 has a streamlined shape that constitutes a part of the inclined surface 650 and is inclined forward and downward. The second cover 67 is rigidly fixed to the deck 12 and does not swing unlike the first cover 66. The second cover 67 mainly covers the cable 82 of the wiring portion 8 and a penetration part of the deck 12 of the cable 82. The left side of the second cover 67 is attached with a side cover 68 covering a side space between the first cover 66 and the second cover 67.

As described above, by dividing the cover 65 into two, which is the first cover 66 and the second cover 67, the second monitor 6 can be covered with the first cover 66 that follows the tilting operation of the second monitor 6. Therefore, even in an aspect where the second monitor 6 can be tilted, it is possible to suppress infiltration of rainwater into the second monitor 6 and the mount part thereof.

The second cover 67 is a separate cover isolated from the first cover 66, and the edge cut portion 65A exists therebetween. Therefore, when a water droplet or a wave falls on the cover of the second monitor 6, the water droplet can be released from the edge cut portion 65A. Specifically, a water droplet having entered from the edge cut portion 65A can be guided along the downward inclination of the first cover 66 and dropped from the front end 66F. Therefore, it is possible to suppress infiltration of water into the wiring portion 8, particularly, the connection portion of the male connector 81. Even when a water droplet of a sailing wave rises along the inclined surface 650 of the second cover 67, it is possible to drop the water droplet downward at the edge cut portion 65A, and it is possible to suppress the water droplet from falling on the screen 6M of the second monitor 6 beyond the cover 65.

[Relationship between Second Monitor and Side Hatch]

Figure 9:
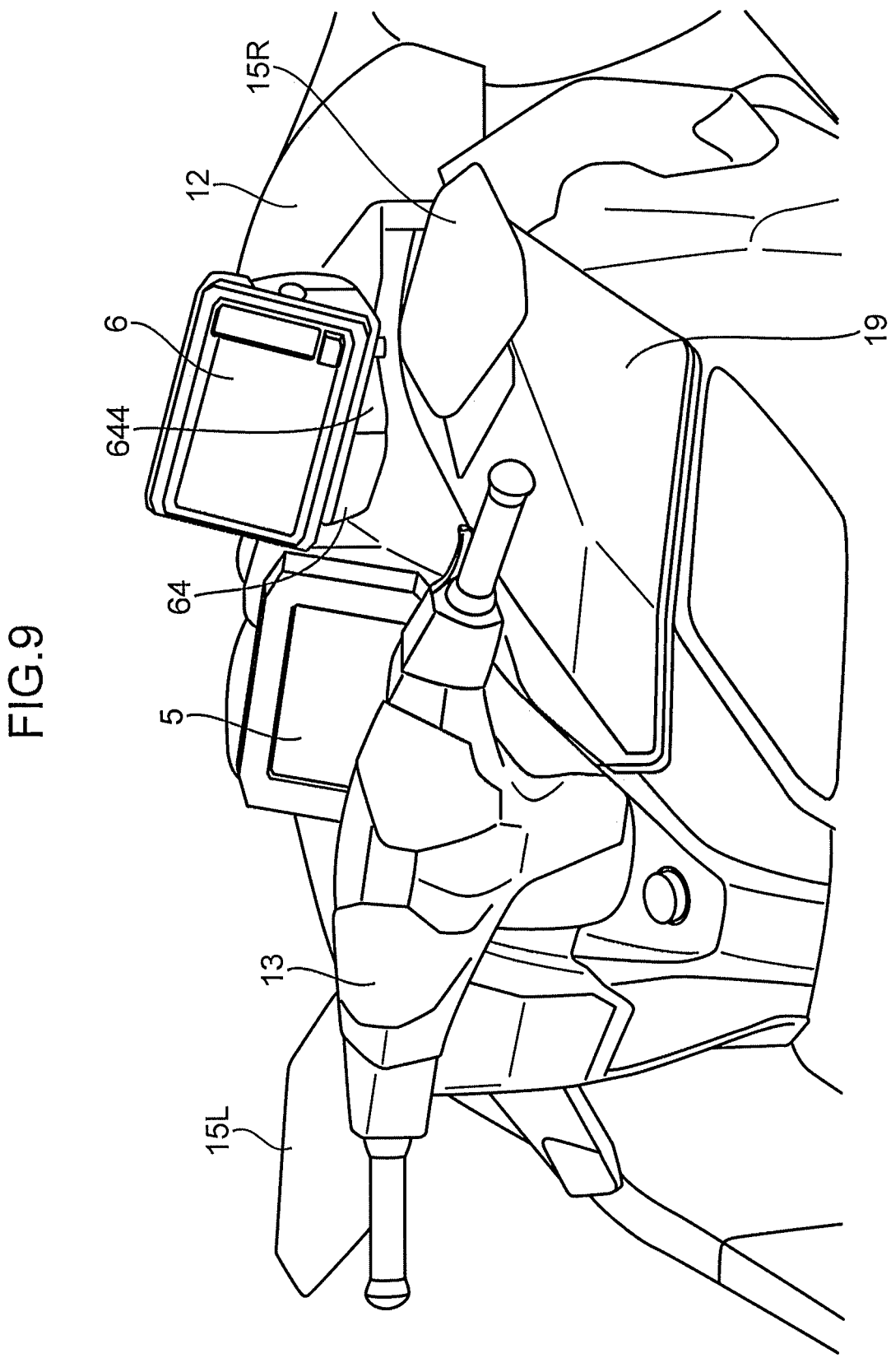
FIG. 9 is a perspective view of a front part of the personal watercraft.
Figure 10:
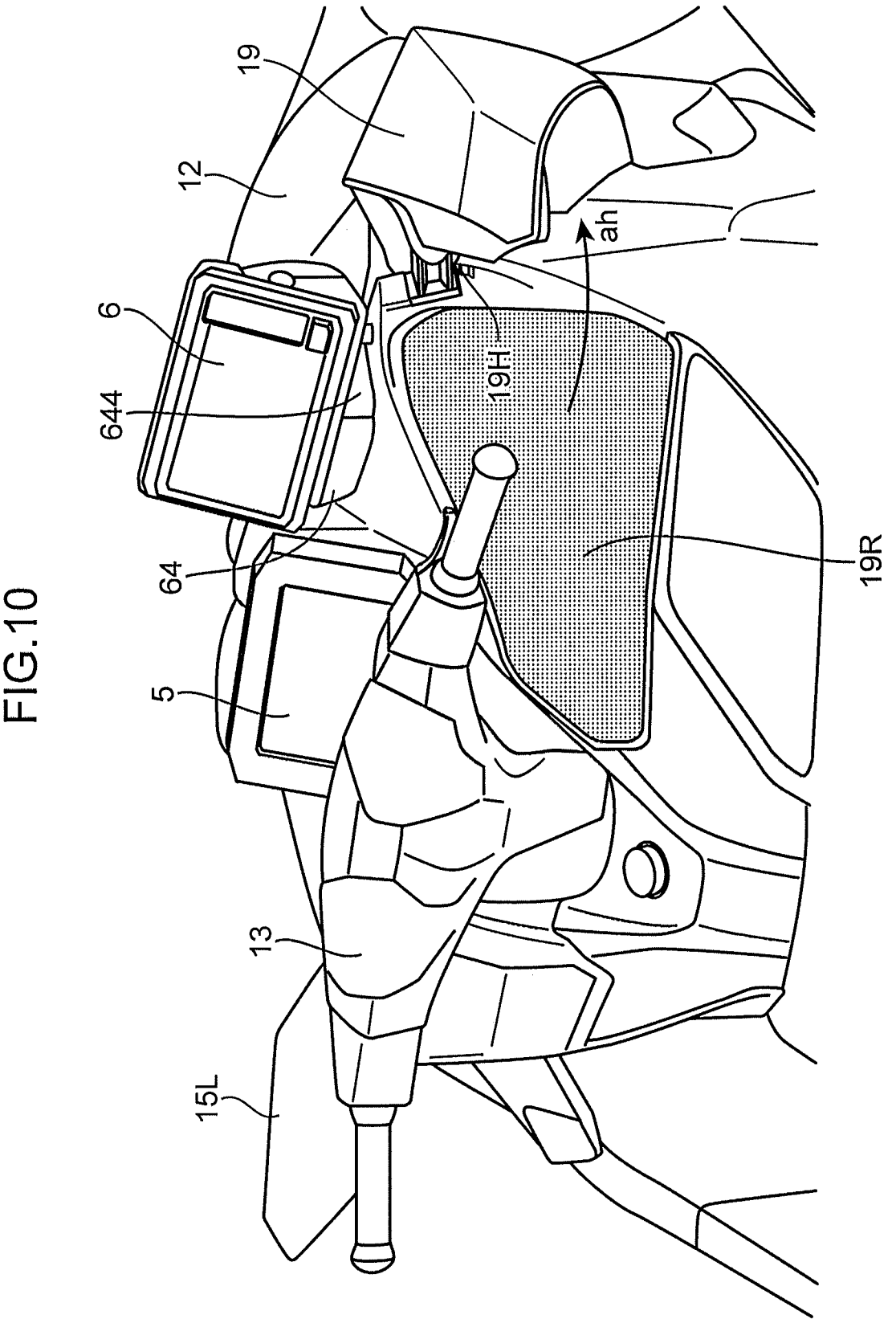
FIG. 10 is a perspective view of a front part of the personal watercraft, and is a view illustrating a state where a side hatch is opened.

FIG. 9 is a perspective view of the front part of the personal watercraft 1. The deck 12 includes a side hatch 19 on the right front of the operator seat 14. The side hatch 19 constitutes a part of the body of the deck 12, and the right side mirror 15R is attached to the side hatch 19. FIG. 10 is a perspective view illustrating a state where the side hatch 19 is opened.

The side hatch 19 has a substantially elliptical shape extending from the vicinity of the lower part of the grip of the handle 13 to a position forward relative to the front end of the cover 65 of the second monitor. The side hatch 19 serves as a cover that opens and closes a side luggage room 19R. The vicinity of the front end of the side hatch 19 is provided with a hinge joint portion 19H to be joined to the main body of the deck 12 with a hinge in an openable and closable manner. The second monitor 6 is attached to the deck 12 at a position not interfering an open-close movement line of the side hatch 19.

As illustrated in FIG. 9, about the right half of the second monitor 6 overlaps the vicinity of the front of the closed side hatch 19 in the up-down direction. Since the support 64 of the second monitor 6 supports the second monitor 6 from below, the upper edge of the side hatch 19 and the lower end of the support 64 naturally have a close positional relationship. As indicated by arrow ah in FIG. 10, the side hatch 19 is opened with the hinge joint portion 19H as a pivot axis. At this time, it is necessary to devise so that the support 64 does not exist on the movement locus of the upper edge of the side hatch 19.

Therefore, in the present embodiment, the position interfering with the open-close movement line of the side hatch 19 in the support 64 is provided with the cutout part 644 described above as the cutout structure part. That is, when the support 64 extends to the lower part of the right half of the second monitor 6 overlapping the side hatch 19 in the up-down direction, the upper edge of the side hatch 19 interferes and the opening operation of the side hatch 19 is hindered. In order to avoid this, the cutout part 644 having a shape where the vicinity of the right end of the support 64 (support pedestal 642) is obliquely cut out is formed. Due to this, even if the second monitor 6 and its support member thereof are added, it is possible to have a structure that does not affect the open-close operation of the side hatch 19.

Other Embodiments

Although an embodiment of the present disclosure has been described above, the present disclosure is not limited to the above embodiment. For example, the following modified embodiments may be adopted.

In the above embodiment, an example has been described in which the first monitor 5 and the second monitor 6 are independently installed in separate housings. Alternatively, the first monitor 5 and the second monitor 6 may be accommodated in a common housing, the screen 5M of the first monitor 5 may be arranged in the vicinity of the center axis C, and the screen 6M of the second monitor 6 may be arranged adjacent to the right or left of the screen 5M. A plurality of monitors may be installed as the second monitor 6. For example, the second monitor 6 may include two monitors arranged up and down.

In the above embodiment, the full color TFT liquid crystal display has been exemplified as the preferred first monitor 5 and second monitor 6. Alternatively, a segment-type liquid crystal panel, an organic EL display, or the like may be used as the first monitor 5 and the second monitor 6. A full-color display is not necessarily required, and a display of several colors or a black-and-white display may be adopted as the first monitor 5 and the second monitor 6.

In the above embodiment, the engine 2 having an internal combustion engine has been exemplified as a propulsion drive source of the personal watercraft 1, but a propulsion drive source other than the engine 2 may be used. For example, a drive source using an electric motor or a hybrid drive source of an electric motor and an engine may be used.

In the above embodiment, an example in which the personal watercraft 1 is a jet propulsion type watercraft has been described. The personal watercraft 1 according to the present disclosure may be a personal watercraft other than the jet propulsion type. In the above embodiment, the straddle-type personal watercraft 1 has been exemplified. The personal watercraft 1 may be a stand-up type personal watercraft.

Summary of Present Disclosure

The specific embodiments described above include a disclosure having the following configurations.

A personal watercraft according to a first aspect of the present disclosure includes: a watercraft body including an operator boarding section; a first monitor arranged forward the operator boarding section and in a vicinity of a center axis passing through a left-right direction center of the watercraft body and extending in a front-rear direction of the watercraft body; a side mirror arranged forward the operator boarding section and on at least one side of left and right with respect to the center axis of the watercraft body; and a second monitor arranged between the first monitor and the left or right side mirror.

According to the first aspect, the first monitor is arranged in the vicinity of the center axis of the watercraft body, and the second monitor is arranged between the first monitor and the side mirror. That is, the first and second monitors are arranged so as not to overlap the side mirror in the front-rear direction as viewed from the operator boarding section. Therefore, it is possible to present the operator the display information by the second monitor in addition to the display information of the first monitor while ensuring rear visibility by the side mirror.

A personal watercraft according to a second aspect is the personal watercraft of the first aspect, in which the first monitor is a monitor that displays state information of the watercraft body, and the second monitor is a monitor that displays additional information other than the state information.

According to the second aspect, the state information of the watercraft body necessary for the operation is displayed on the first monitor arranged in the vicinity of the center axis of the watercraft body. Therefore, it is possible to display the state information in an easy-to-see manner to the operator who is operating the personal watercraft. The additional information desired by the operator can be appropriately displayed through the second monitor.

A personal watercraft according to a third aspect is the personal watercraft of the second aspect, further including a sonar that is equipped on the watercraft body and detects an underwater state below the watercraft body, in which the second monitor is a monitor that displays fish-finding information sensed by the sonar.

According to the third aspect, fish-finding information can be provided through the second monitor to the operator or the passenger who enjoys fishing using the personal watercraft.

A personal watercraft according to a fourth aspect is the personal watercraft of the second aspect, in which the state information includes any one or more of a traveling speed of the watercraft body, a traveling time, a remaining amount of fuel, and presence or absence of abnormality of a drive source of the watercraft body, and the additional information includes any one or more of map information and position information of the watercraft body based on GPS data, water depth or obstacle information below the watercraft body, weather information, tidal information, and water temperature information.

According to the fourth aspect, it is possible to display, in a timely manner, the above-described state information onto the first monitor and the above-described additional information onto the second monitor.

A personal watercraft according to a fifth aspect is the personal watercraft of the first aspect, in which the first monitor displays traveling information that changes in response to traveling of the watercraft body, and the second monitor displays traveling stopping information that changes even in a traveling stop state of the watercraft body.

According to the fifth aspect, the traveling information of the watercraft body necessary for the operation is displayed on the first monitor arranged in the vicinity of the center axis of the watercraft body. Therefore, it is possible to display the traveling information in an easy-to-see manner to the operator who is operating the personal watercraft. Traveling stopping information desired by the operator can be appropriately displayed through the second monitor.

A personal watercraft according to a sixth aspect is the personal watercraft of the first to fifth aspects, in which the second monitor has a display region larger than a display region of the first monitor. According to the sixth aspect, it is possible to improve visibility of detailed additional information such as map information.

A personal watercraft according to a seventh aspect is the personal watercraft of the first to sixth aspects, in which the second monitor is a monitor that displays image information other than characters. According to the seventh aspect, various image information can be provided to the operator through the second monitor.

A personal watercraft according to an eighth aspect is the personal watercraft of the first to seventh aspects, in which the watercraft body includes a deck and a hull, and the personal watercraft further includes a support member attached to an upper surface of the deck and supporting the second monitor, and a cover covering the second monitor and having an inclined surface extending from the upper surface of the deck toward an upper edge of the second monitor.

According to the eighth aspect, the mount part of the second monitor to the deck is covered with the cover. Therefore, the second monitor can be protected from rainwater, wave splash, sailing waves of the personal watercraft, and the like.

A personal watercraft according to a ninth aspect is the personal watercraft of the eighth aspect, in which the cover has a shape covering, in addition to the second monitor, the support member and a wiring portion connected to the second monitor.

According to the ninth aspect, the support member of the second monitor and the wiring portion can also be protected from rainwater, wave splash, sailing waves of the personal watercraft, and the like.

A personal watercraft according to a tenth aspect is the personal watercraft of the eighth or ninth aspect, in which the support member supports the second monitor in a tiltable manner, and the cover includes a first cover extending forward from an upper edge of the second monitor and following tilting of the second monitor, and a second cover extending from a front end position of the first cover to the upper surface of the deck.

According to the tenth aspect, since the cover is divided into two, the second monitor can be covered following the tilting operation of the second monitor. Therefore, even in an aspect where the second monitor can be tilted, it is possible to suppress infiltration of rainwater into the second monitor and the mount part thereof.

A personal watercraft according to an eleventh aspect is the personal watercraft of the eighth or ninth aspect, in which the second monitor includes a wiring portion on a back surface side, and the cover includes a first cover extending forward from an upper edge of the second monitor and covering the wiring portion, and a second cover that is a separate cover isolated from the first cover and extending from a front end position of the first cover to the upper surface of the deck.

According to the eleventh aspect, when a water droplet or a wave falls on the second monitor, the water droplet can be released from the isolated portion between the first cover and the second cover. Therefore, it is possible to suppress intrusion of water into the wiring portion and the falling of a water droplet onto the second monitor surface beyond the cover.

A personal watercraft according to a twelfth aspect is the personal watercraft of the first to eleventh aspects, in which the watercraft body includes a deck and a hull, the deck includes a side hatch joined to a main body of the deck with a hinge in an openable and closable manner in front of the operator boarding section, and the second monitor is attached to the deck at a position not interfering an open-close movement line of the side hatch.

According to the twelfth aspect, installation of the side hatch can add a luggage room or the like of the personal watercraft and another accommodation space. On the other hand, the second monitor can be configured not to interfere with opening and closing of the side hatch.

A personal watercraft according to a thirteenth aspect is the personal watercraft of the twelfth aspect, further including a support member attached to the upper surface of the deck and supporting the second monitor, in which the support member includes a cutout structure part at a position interfering with an open-close movement line of the side hatch.

According to the thirteenth aspect, while the second monitor is stably supported by the support member, installation of the cutout structure part can achieve a configuration where the side hatch does not interfere with the support member.

A personal watercraft according to a fourteenth aspect includes: a watercraft body including an operator boarding section; a left side mirror and a right side mirror arranged forward the operator boarding section and on left and right, respectively, with respect to a center axis passing through a left-right direction center of the watercraft body and extending in a front-rear direction of the watercraft body; and a first monitor and a second monitor arranged forward the operator boarding section and between the left side mirror and the right side mirror, in which the first monitor is arranged closer to the center axis relative to the second monitor.

According to the fourteenth aspect, the first monitor and the second monitor are arranged between the left and right side mirrors, and the first monitor is arranged close to the center axis of the watercraft body. That is, the first and second monitors are arranged so as not to overlap the left and right side mirrors in the front-rear direction as viewed from the operator boarding section. Therefore, it is possible to present the operator the display information by the second monitor in addition to the display information of the first monitor while ensuring rear visibility by the left and right side mirrors.

A personal watercraft according to a fifteenth aspect includes: a watercraft body including an operator seat on which an operator boards; a side mirror arranged forward the operator seat and away in one of a left-right direction of the watercraft body from a center axis passing through a left-right direction center of the watercraft body and extending in the front-rear direction; a first monitor arranged forward the operator seat and closer to the center axis of the watercraft body relative to the side mirror; and a second monitor arranged forward the operator seat, closer to the center axis of the watercraft body relative to the side mirror, and closer to outside in the left-right direction relative to the first monitor.

According to the fifteenth aspect, the first monitor is arranged closer to the center axis relative to the side mirror, and the second monitor is arranged closer to the center axis relative to the side mirror but closer to the outside in the left-right direction relative to the first monitor. That is, the first and second monitors are arranged so as not to overlap the side mirror in the front-rear direction as viewed from the operator boarding section. Therefore, it is possible to present the operator the display information by the second monitor in addition to the display information of the first monitor while ensuring rear visibility by the side mirror.

A personal watercraft according to a sixteenth aspect is the personal watercraft of the fifteenth aspect, in which the first monitor is a monitor that displays traveling information that changes in response to traveling of the watercraft body, and the second monitor is a monitor that displays information on an underwater state below the watercraft body.

According to the sixteenth aspect, the traveling information of the watercraft body necessary for the operation is displayed on the first monitor arranged in the vicinity of the center axis of the watercraft body. Therefore, it is possible to display the traveling information in an easy-to-see manner to the operator who is operating the personal watercraft. It is possible to present the operator information on the underwater state below the watercraft body through the second monitor.

What is claimed is:

1. A personal watercraft comprising:
a watercraft body including an operator boarding section;
a sonar on the watercraft body to detect an underwater state below the watercraft body;
a first monitor arranged forward the operator boarding section and in a vicinity of a center axis passing through a left-right direction center of the watercraft body and extending in a front-rear direction of the watercraft body;
a side mirror arranged forward the operator boarding section and on at least one side of left and right with respect to the center axis of the watercraft body; and
a second monitor arranged between the first monitor and the left or right side mirror,
wherein:
the first monitor is a monitor that displays state information of the watercraft body, and
the second monitor is a monitor that displays fish-finding information sensed by the sonar.

2. The personal watercraft of claim 1, wherein:
the state information includes any one or more of a traveling speed of the watercraft body, a traveling time, a remaining amount of fuel, and presence or absence of abnormality of a drive source of the watercraft body, and
the second monitor displays additional information includes any one or more of map information and position information of the watercraft body based on GPS data, water depth or obstacle information below the watercraft body, weather information, tidal information, and water temperature information.

3. The personal watercraft of claim 1, wherein:
the first monitor displays traveling information that changes in response to traveling of the watercraft body.

4. A personal watercraft, comprising:
a watercraft body including an operator boarding section;
a first monitor arranged forward the operator boarding section and in a vicinity of a center axis passing through a left-right direction center of the watercraft body and extending in a front-rear direction of the watercraft body;
a side mirror arranged forward the operator boarding section and on at least one side of left and right with respect to the center axis of the watercraft body; and
a second monitor arranged between the first monitor and the left or right side mirror,
wherein the second monitor has a display region larger than a display region of the first monitor.

5. The personal watercraft of claim 4, wherein:
the second monitor is a monitor that displays image information other than characters.

6. The personal watercraft of claim 1, wherein:
the watercraft body includes a deck and a hull, and
the personal watercraft further comprises:
a support attached to an upper surface of the deck and supporting the second monitor; and
a cover covering the second monitor and having an inclined surface extending from the upper surface of the deck toward an upper edge of the second monitor.

7. The personal watercraft of claim 6, wherein:
the cover has a shape covering, in addition to the second monitor, the support and a wiring portion connected to the second monitor.

8. The personal watercraft of claim 6, wherein:
the support supports the second monitor in a tiltable manner, and
the cover includes
a first cover extending forward from the upper edge of the second monitor and following tilting of the second monitor, and
a second cover extending from a front end position of the first cover to the upper surface of the deck.

9. The personal watercraft of claim 6, wherein:
the second monitor includes a wiring portion on a back surface side, and
the cover includes:
a first cover extending forward from an upper edge of the second monitor and covering the wiring portion, and
a second cover that is a separate cover isolated from the first cover and extending from a front end position of the first cover to the upper surface of the deck.

10. The personal watercraft of claim 1, wherein:
the watercraft body includes a deck and a hull,
the deck includes a side hatch joined to a main body of the deck with a hinge in an openable and closable manner in front of the operator boarding section, and
the second monitor is attached to the deck at a position not interfering with an open-close movement line of the side hatch.

11. The personal watercraft according to claim 10, further comprising:
a support attached to an upper surface of the deck and supporting the second monitor, wherein
the support includes a cutout structure part at a position interfering with an open-close movement line of the side hatch.

12. A personal watercraft comprising:
a watercraft body including an operator boarding section;
a left side mirror and a right side mirror arranged forward the operator boarding section and on left and right, respectively, with respect to a center axis passing through a left-right direction center of the watercraft body and extending in a front-rear direction of the watercraft body; and
a first monitor and a second monitor arranged forward the operator boarding section and between the left side mirror and the right side mirror, wherein
the first monitor is arranged closer to the center axis relative to the second monitor.

13. The personal watercraft of claim 12, wherein
the first monitor is a monitor that displays traveling information that changes in response to traveling of the watercraft body, and
the second monitor is a monitor that displays information on an underwater state below the watercraft body.

14. The personal watercraft of claim 4, wherein:
the first monitor is a monitor that displays state information of the watercraft body, and
the second monitor is a monitor that displays additional information other than the state information.

15. The personal watercraft according to claim 14, further comprising:
a sonar that is equipped on the watercraft body and detects an underwater state below the watercraft body,
wherein the second monitor is a monitor that displays fish-finding information sensed by the sonar.

16. The personal watercraft of claim 4, wherein:
the first monitor displays traveling information that changes in response to traveling of the watercraft body, and
the second monitor displays traveling stopping information that changes even in a traveling stop state of the watercraft body.

17. The personal watercraft of claim 8, wherein:

a front end of the first cover and a rear end of the second cover partially overlap each other in an up-down direction.

18. The personal watercraft of claim 11, wherein:

the cutout structure part is a part in which a right half of a support pedestal of the support is cut out obliquely in an upper right direction from a lower end toward an upper end of the support pedestal.

19. The personal watercraft of claim 4, wherein:

an edge cut portion exists between the first cover and the second cover, and the first cover is configured such that a water droplet entering from the edge cut portion is guided along a downward inclination of the first cover and dropped from a front end of the first cover.

20. The personal watercraft of claim 6, wherein:

the support includes a monitor holder having a swing support that supports the second monitor such that the second monitor is tiltable about an axis.

* * * * *